(12) United States Patent
Herman et al.

(10) Patent No.: US 10,875,496 B2
(45) Date of Patent: Dec. 29, 2020

(54) VEHICLE LOAD PREDICTION

(71) Applicant: Ford Global Technologies, LLC, Dearborn, MI (US)

(72) Inventors: David Michael Herman, Southfield, MI (US); David A. Herman, Southfield, MI (US); Nunzio DeCia, Northville, MI (US); David Joseph Orris, Southgate, MI (US); Nicholas Alexander Scheufler, Flat Rock, MI (US); Stephen Jay Orris, Jr., New Boston, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 330 days.

(21) Appl. No.: 16/037,689

(22) Filed: Jul. 17, 2018

(65) Prior Publication Data

US 2020/0023811 A1  Jan. 23, 2020

(51) Int. Cl.
| | | |
|---|---|---|
| *B60R 25/01* | (2013.01) | |
| *G06N 5/04* | (2006.01) | |
| *B60R 25/30* | (2013.01) | |
| *G01G 19/414* | (2006.01) | |
| *G01G 19/62* | (2006.01) | |

(52) U.S. Cl.
CPC ............. *B60R 25/01* (2013.01); *B60R 25/30* (2013.01); *G01G 19/414* (2013.01); *G06N 5/04* (2013.01); *G01G 19/62* (2013.01)

(58) Field of Classification Search
CPC .......... B60R 25/01; B60R 25/30; G06N 5/04; G06N 20/00; G01G 19/414; G01G 19/62; G01G 19/08; G01G 19/12; G01S 17/88; G01B 11/0608; G01B 11/26; G06K 9/00221; G06K 9/00832; G06K 9/6267
USPC .......................................................... 701/36
See application file for complete search history.

(56) References Cited

U.S. PATENT DOCUMENTS

| | | |
|---|---|---|
| 6,459,367 B1 | 10/2002 | Green et al. |
| 7,693,626 B2 | 4/2010 | Breed et al. |
| 8,103,414 B2 | 1/2012 | Boss et al. |
| 2012/0310680 A1 | 12/2012 | Bourla |
| 2017/0113607 A1 | 4/2017 | Corrales Salgado et al. |
| 2017/0158206 A1 | 6/2017 | Obradovich |
| 2017/0308097 A1 | 10/2017 | Switkes et al. |
| 2018/0180247 A1* | 6/2018 | Park ...................... F21S 41/675 |
| 2018/0251122 A1* | 9/2018 | Golston ................ B60W 40/02 |

FOREIGN PATENT DOCUMENTS

| | | | |
|---|---|---|---|
| KR | 20080018539 | * | 2/2008 |
| WO | 9305492 | | 3/1993 |

OTHER PUBLICATIONS

Chaithanya et al., "Object Weight Estimation From 2D Images", Sep. 2015, "ARPN Journal of Engineering and Applied Sciences", vol. 10, No. 17, pp. 7574-7578.*

(Continued)

*Primary Examiner* — Muhammad Shafi
(74) *Attorney, Agent, or Firm* — Frank A. MacKenzie; Bejin Bieneman PLC (57) ABSTRACT

An object outside of a vehicle can be detected with vehicle sensor data. A load for the vehicle can be predicted at least in part based on classifying the object. A vehicle component can be actuated based on the predicted load.

20 Claims, 4 Drawing Sheets

(56) References Cited

OTHER PUBLICATIONS

Cadena et al., "Past, Present, and Future of Simultaneous Localization and Mapping: Towards the Robust-Perception Age", IEEE Transactions on Robotics, 32(6) pp. 1309-1332, 2016.

Chaithanya et al., "Object Weight Estimation From 2D Images", ARPN Journal of Engineering and Applied Sciences, vol. 10, No. 17, Sep. 2015 pp. 7574-7578.

Chen et al., "Hybrid discrete particle swarm optimization algorithm for capacitated vehicle routing problem", Journal of Zhejiang University—Science A, Apr. 2006, vol. 7, Issue 4 (Abstract provided).

Levinson et al., "Robust Vehicle Localization in Urban Environments Using Probabilistic Maps," Conference Paper in Proceedings—IEEE International Conference on Robotics and Automation, Jun. 2010 (Abstract provided).

Nguyen et al., "Seeing Human Weight from a Single RGB-D Image", University of Dayton, eCommons, Computer Science Faculty Publications, Department of Computer Science, Sep. 2014.

Niu et al., "A genetic algorithm for the vehicle routing problem with multi-type and multi-cost", Intelligent System and Knowledge Engineering, Nov. 17-19, 2008.

Standley et al., "image 2mass: Estimating the Mass of an Object from Its Image", 1st Conference on Robot Learning (CoRL 2017).

Velardo et al., "Weight estimation from visual body appearance", EURECOM, http://image.eurecom.fr, 4th IEEE International Conference on Biometrics: Theory, Applicants and Systems, Sep. 27-29, 2010.

Whitford et al., Securing the Load: A Guide to Safe and Legal Transportation of Cargo and Equipment, Purdue University, pp. 75, Jun. 2008.

Wolcott et al., "Visual localization within Lidar maps for automated urban driving", Oct. 2014, https://www.researchgate.net/publication/289677903_Visual_localization_within_LIDAR_maps_for_automated_urban_driving.

Xiao et al., "Development of a fuel consumption optimization model for the capacitated vehicle routing problem", Computers & Operations Research, 39(8): 1419-143, Jul. 2012.

Zhang et al.", Carried Load Measurement Based on Gait Analysis and Human Kinetics", Image and Signal Processing, May 27-30, 2008.

Zhang et al., "Weight measurement using image-based pose analysis", Progress in Natural Science, Dec. 2008.

* cited by examiner

VEHICLE LOAD PREDICTION

BACKGROUND

Vehicle weight combined with occupant and/or cargo weight may affect the operation of a vehicle. To determine if a vehicle is loaded beyond safe capacity and/or in a manner consistent with effective and/or efficient operation of the vehicle, sensors in a vehicle can be used to measure a vehicle load, e.g., weight sensors, suspension sensors, etc. However, such vehicle sensors require items to be placed in a vehicle for a load to be measured. Moreover, such sensors measure a load on a local portion of a vehicle, rather than measuring a load associated with an item or set of items.

DETAILED DESCRIPTION

Disclosed herein is a method, comprising detecting an object outside of a vehicle with vehicle sensor data, predicting a load for the vehicle at least in part based on classifying the object; and actuating a vehicle component based on the predicted load.

The method can further comprise, based on classifying the object, determining whether the vehicle can accept the predicted load.

The method can further comprise specifying a location within a vehicle sensor field of view at which the object is to be detected.

The method can further comprise, upon determining that the vehicle cannot accept the predicted load, transmitting a message to a user.

The method can further comprise predicting the load according to at least one of a weight and a volume of the object.

The method can further comprise predicting the load based on user data in addition to classifying the object.

The method can further comprise that the user data includes one or more of a location, a destination, a load history, and a number of user-specified cargo objects.

The method can further comprise predicting the load in part based on an estimated size of the object.

The method can further comprise predicting the load in part based on data from a cargo source.

The method can further comprise that the sensor data includes at least one of an image, LIDAR data, weight sensor data, and vehicle suspension data.

A computer comprises a processor and a memory, the memory storing instructions executable by the processor to detect an object outside of a vehicle with vehicle sensor data, predict a load for the vehicle at least in part based on classifying the object, and actuate a vehicle component based on the predicted load.

The computer memory can further store instructions to, based on classifying the object, determine whether the vehicle can accept the predicted load.

The computer memory can further store instructions to specify a location within a vehicle sensor field of view at which the object is to be detected.

The computer memory can further store instructions to, upon determining that the vehicle cannot accept the predicted load, transmit a message to a user.

The computer memory can further store instructions to predict the load according to at least one of a weight and a volume of the object.

The computer memory can further store instructions to predict the load based on user data in addition to classifying the object.

The computer can include that the user data includes one or more of a location, a destination, a load history, and a number of user-specified cargo objects.

The computer memory can further store instructions to predict the load in part based on an estimated size of the object.

The computer memory can further store instructions to predict the load in part based on data from a cargo source.

The computer can include that the sensor data includes at least one of an image, LIDAR data, weight sensor data, and vehicle suspension data.

Vehicle components 120 may be actuated based on a load, e.g., an estimated total weight measurement, predicted or estimated to result from placing one or more objects in or on a vehicle 101. Providing a weight measurement of objects, which in the present context include human passengers and animals as well as packages and other inanimate objects, allows for a determination as to whether the vehicle 101 has sufficient capacity to transport the object(s).

A system 100 may determine a load, e.g., estimated or predicted weight measurement, based on various factors, including vehicle sensor data from sensing the one or more objects outside of the vehicle 101, e.g., on a curb within a field of view of vehicle sensors 110. The factors may alternatively or additionally include one or more of a user history, a user request, and a user location. The user history may include data from the user's past trips such as a number of passengers, a weight of each passenger, a number of items of cargo, a weight of the cargo, and dimensions of the cargo. The user request may include data such as an origin and a destination of a route. A user or other location mentioned herein is a physical location on the surface of the earth, typically specified by geo-coordinates as used in a Global Positioning System (GPS). User location data (e.g., geo-coordinates) may be associated with a classification of the origin and/or a classification of the destination. As an example, the system 100 may determine that a user requesting a route originating at a location classified as a long-haul transportation hub such as an airport or train station may have luggage. Furthermore, the classification may provide data specifying regarding typical luggage dimensions and/or weight, i.e., image recognition can identify a type of luggage that is then associated in stored data with a length, width, height, typical packed weight, etc.

When the vehicle 101 arrives at a route origin, vehicle sensors 110 can detect an object (or objects) outside the vehicle 101, and estimate a load, e.g., predict a weight measurement of the object(s). A vehicle computer 105 may be programmed to allow an object to be loaded into the vehicle 101 to be transported on the route based on factors that can include the predicted load, possibly in combination with other factors, such as a route distance, a route terrain, weight based road restrictions, a road surface along a route (e.g., predicted road friction and/or suspension vibrations can be considered), and environmental conditions such as ambient temperature, precipitation, etc.

Figure 1:
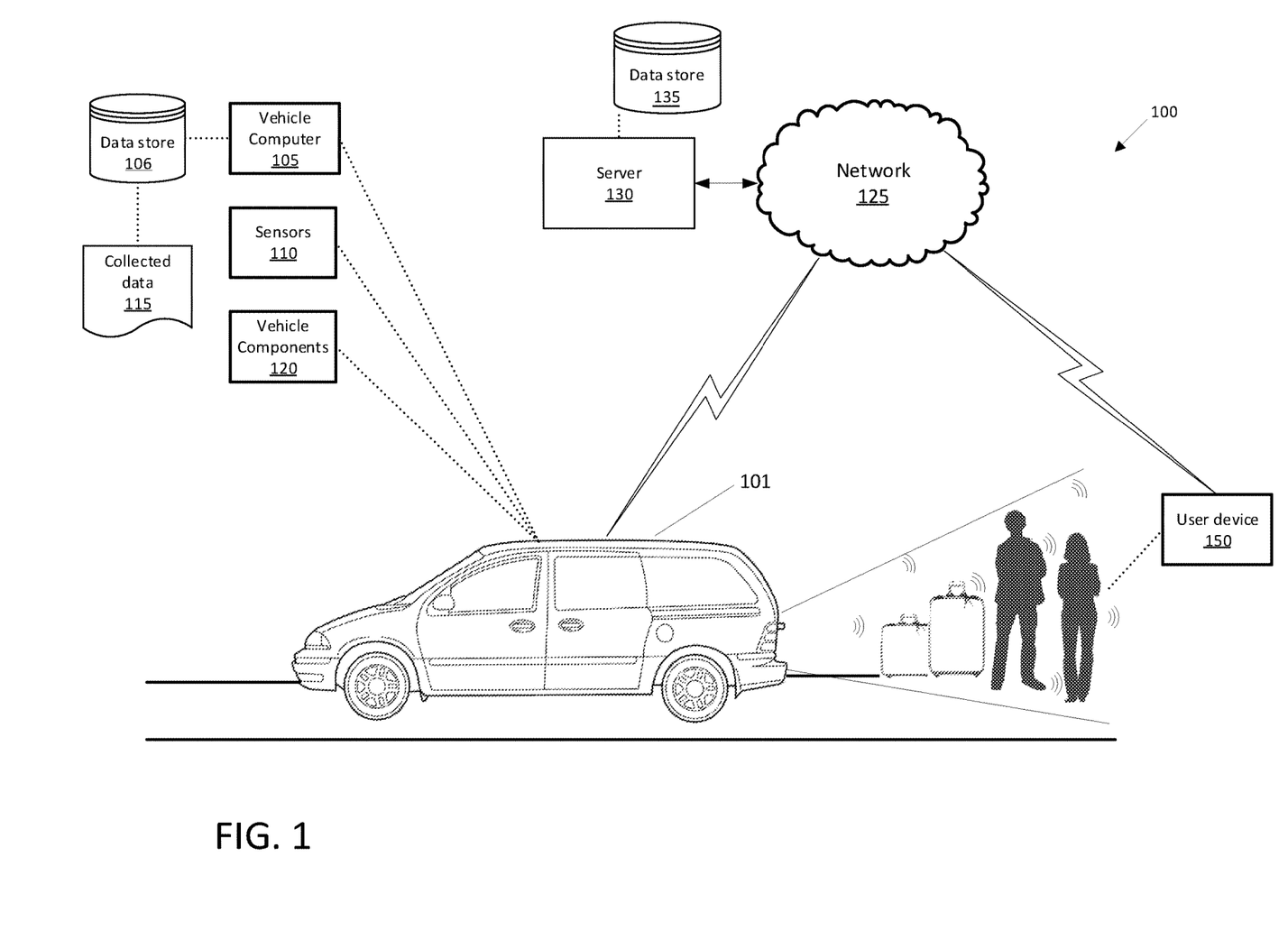
FIG. 1 is an example illustration of a vehicle including a system for predicting a load.

FIG. 1 illustrates an example system 100 for predicting a vehicle 101 load resulting from one or more objects, and actuating one or more vehicle 101 components 120 based on the predicted load. The system 100 includes the vehicle computer 105, vehicle components 120, vehicle sensors 110, collected data 115, and a data store 106. The vehicle computer 105 is programmed to receive collected data 115 from one or more vehicle sensors 110, concerning various metrics describing one or more objects specified for transport in or on the vehicle 101.

For example, the metrics may include data 115 about objects outside of a vehicle 101, e.g., not touching the vehicle 101 and within a specified distance, e.g., five meters, ten meters, etc., and/or a field of view of vehicle sensors 110, e.g., a number of passengers, a number of objects, a total predicted weight of objects, respective predicted weights of each of one or more objects included in the total predicted weight, etc. Further, an expected load can be predicted based on geo-coordinates. For example, the data store 106 or some other data store can store geo-coordinates and expected loads (e.g., weights and/or dimensions of expected loads) for respective geo-coordinates. For example, if geo-coordinates are a location of a grocery store, the data store 106 could include a weight and dimensions of groceries typically included in a vehicle 101 load when the vehicle 101 is picking up a user at the geo-coordinates, i.e., in this example, the grocery store.

Further metrics available from the vehicle sensors 110 may include measurements of vehicle systems and vehicle components 120 (e.g. a steering system, a powertrain system, a brake system, internal sensing, external sensing, etc.). The vehicle computer 105 may be programmed to collect data 115 from the vehicle 101 in which it is installed, sometimes referred to as a "host vehicle," and/or may be programmed to collect data 115 about and/or from, e.g., via dedicated short-range communications (DSRC) service or the like, a second vehicle, i.e., a vehicle other than the vehicle 101, e.g., a "target vehicle." Additionally, it is possible that the vehicle computer 105 receives data 115 from a remote server, e.g., via a cellular or other wireless network.

The vehicle computer 105 is generally programmed for communications on a controller area network (CAN) bus or the like. The vehicle computer 105 may also have a connection to an onboard diagnostics connector (OBD-II). Via the CAN bus, OBD-II, and/or other wired or wireless mechanisms, the vehicle computer 105 may transmit messages to various devices in a vehicle 101 and/or receive messages from the various devices, e.g., controllers, actuators, vehicle sensors 110, etc. Alternatively or additionally, in cases where the vehicle computer 105 actually comprises multiple devices, the CAN bus or the like may be used for communications between devices represented as the vehicle computer 105 in this disclosure. In addition, the vehicle computer 105 may be programmed for communicating with the network 125, which, as described below, may include various wired and/or wireless networking technologies, e.g., cellular, Bluetooth®, wired and/or wireless packet networks, etc.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of vehicle components 120 include a propulsion component (that includes, e.g., an internal combustion engine and/or an electric motor, etc.), a transmission component, a steering component (e.g., that may include one or more of a steering wheel, a steering rack, etc.), a brake component, a movable seat, and the like. One of the vehicle components 120 may be actuated in response to a predicted load. As an example, vehicle components 120 such as door locks may lock or unlock the vehicle 101 based on a predicted load. As other examples, a vehicle 101 hatchback or trunk lid could be opened, a parking brake could be actuated, or, if a load exceeds the capacity of a vehicle 101, vehicle powertrain, brakes, and/or steering could be actuated to move the vehicle from a pickup location without performing a pickup.

A variety of devices can provide collected data 115 in addition to or in lieu of vehicle sensors 110. For example, various controllers, e.g., electronic control units (ECUs), in a vehicle 101 may provide data 115 via the CAN bus, e.g., data 115 from vehicle sensors 110 communicating with the ECU, relating to vehicle speed, acceleration, system and/or component functionality, etc., of any number of vehicles 101, including the host vehicle and/or the target vehicle. Further, vehicle sensors 110 or the like, GPS equipment, etc., could be included in a vehicle 101 and configured as devices to provide data 115 directly to the vehicle computer 105, e.g., via a wired or wireless connection. Vehicle sensors 110 could include mechanisms such as cameras, RADAR, LIDAR, sonar, etc. sensors that could be deployed to determine environmental data 115, e.g., to measure a distance between the vehicle 101 and other vehicles or objects, the kinds of objects near the trajectory of the vehicle 101, the road conditions, locations of roads and traffic signs, etc. Vehicle sensors 110 could be deployed to identify objects and determine the weight measurement of the objects, e.g., as explained below with reference to FIG. 3.

Collected data 115 may include a variety of data collected in a vehicle 101. Examples of collected data 115 are provided above, and moreover, data 115 is generally collected using one or more sensors 110, and may additionally include data calculated therefrom in the vehicle computer 105. In general, collected data 115 may include any data that may be gathered by the vehicle sensors 110 and/or computed from such data.

The data store 106 may be of any known type, e.g., hard disk drives, solid-state drives, servers, or any volatile or non-volatile media. The data store 106 may store the collected data 115 sent from the vehicle sensors 110.

The system 100 further includes a network 125, a server 130, a second data store 135, and a user device 150. The network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, IEEE 802.11, etc.), local area networks (LAN) and/or wide area networks (WAN), including the Internet, providing data communication services.

The server 130 may be configured to determine an appropriate action for one or more vehicles 101, and to provide direction to the vehicle computer 105 to proceed accordingly. The server 130 may be one or more computer servers, each generally including at least one processor and at least one memory, the memory storing instructions executable by the processor, including instructions for carrying out various steps and processes described herein. The server 130 may include or be communicatively coupled to the second data store 135 for storing collected data 115, records relating to potential users as described herein, etc. Further, the server 130 may store data related to a particular vehicle 101 and additionally, one or more other vehicles 101 operating in a geographic area, traffic conditions, weather conditions, etc., within a geographic area, with respect to a particular road, city, etc. The server 130 could be configured to provide alerts to a particular vehicle 101 and/or other vehicles 101.

The user device 150 may be any one of a variety of computing devices including a processor and a memory, e.g., a smartphone, a tablet, a personal digital assistant, etc. The user device 150 may use various wired and/or wireless technologies, such as the network 125 and Bluetooth®, to communicate with the server 130 and/or the vehicle computer 105.

Figure 2:
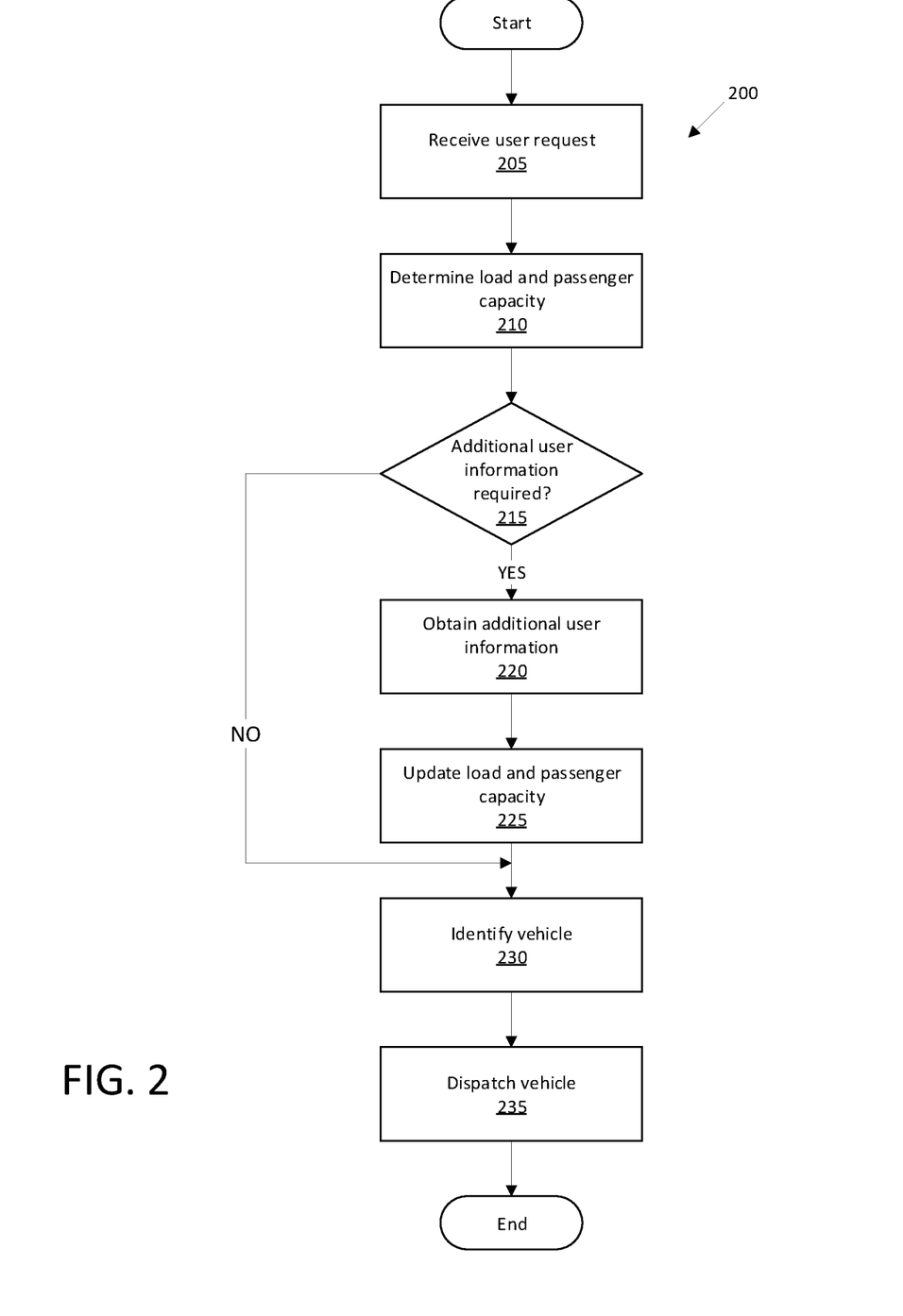
FIG. 2 is an example process for actuating a vehicle component based on a predicted load.

FIG. 2 illustrates a process 200 for actuating a vehicle component 120 based on a predicted load.

The process 200 may begin in a block 205, when the server 130 receives a request from a user device 150. A user request is a message from the user device 150 to a server 130 to request a vehicle 101 for a trip, i.e., a vehicle 101 to transport one or more passengers and/or one or more items of cargo from a route origin to a route destination. The user request includes data such as a user identification, a route origin, a route destination, a number of passengers, a weight of each passenger, a number of items of cargo, and a weight, dimensions, and contents of each cargo, and a scheduled pickup time. For example, a smartphone application or the like running on the user device 150 could request the user to provide input regarding one or more of the foregoing values, which could then be transmitted to the server 130. At a minimum, a user request is typically required to include user identifying information (e.g., one or more of a login ID, password, personal identification number, biometric identifier such as facial or fingerprint recognition, etc.), and an origin and destination.

Next, in a block 210, the server 130 determines a vehicle capacity to meet the user request. Typically, based on data in the user request, the server 130 can determine a predicted total, i.e., aggregate, weight of objects, i.e., passengers and/or cargo, and alternatively or additionally a number of passengers and/or a number of cargo items, and possibly also respective volumes or dimensions of items of cargo (e.g., length, width, height dimensions from which a rectangular solid volume that the cargo item will occupy can be predicted based on image analysis, for example). A weight prediction of passengers and/or cargo can be used by the server 130 as a parameter in selecting a vehicle 101 with a capacity to accommodate the passengers and/or cargo, e.g., as a minimum required load capacity for a vehicle 101 to respond to a request to transport the passengers and/or cargo. A predicted number of passengers can likewise serve as a parameter for the server 130 in selecting a vehicle 101 with an adequate number of passenger seats. Yet further, predicted dimensions and/or volume of respective items of cargo and/or an aggregate set of dimensions and/or volume for items of cargo can serve as a parameter for the server 130 in selecting a vehicle 101 with adequate cargo space.

Yet further, the server 130 may be programmed to estimate energy and/or fuel consumption required by the vehicle 101 to transport the passengers and/or cargo from the route origin to the route destination. For example, expected fuel consumption of a vehicle 101 may be determined according to a stored expected mileage or the like for a vehicle 101 according to a type of terrain (e.g., hilly or flat) and an operating environment (e.g., city versus highway) and a distance of a route. Further, the server 130 may store an adjustment factor to the expected fuel and/or energy consumption of a vehicle 101 over time or distance based on a load, e.g., weight, of cargo and/or passengers. Using the expected fuel and/or energy consumption of a vehicle 101 for the route adjusted by the adjustment factor, the estimate energy and/or fuel consumption required by the vehicle 101 to transport the passengers and/or cargo from the route origin to the route destination may be determined. The server 130 may then use the estimated energy and fuel consumption as a parameter in selecting a vehicle 101, e.g., may select the most fuel/energy efficient vehicle 101 available that meets passenger and/or cargo requirements.

The server 130 may predict the number of passengers and the weight of each of the passengers for a present trip based on data in the user history, as explained further below. The user history may be stored in the second data store 135 accessible by the server 130, and may include data about the user's past trips such as a number of passengers, a passenger identifier (such as the passenger's name and/or substantially unique alpha-numeric identifier) and each passenger's weights. As an example, the server 130 may retrieve a number of passengers from past trips to predict a number of passengers expected on the present trip. The server 130 may predict the number of passengers according to a variety of techniques, such as using an average of the number of passengers on past trips, or using a mode of the number of passengers on past trips (i.e., a number of passengers with the highest occurrence in the past trips). Yet further, the server 130 could identify passengers who most frequently ride with the requesting user (e.g., above a threshold such as 50% of the requesting user's rides) and can then use previously-stored or determined weights of such passengers to predict a number of passengers (including the requesting user) and/or a total predicted passenger weight.

Additionally and/or alternatively, the server 130 may receive the number of passengers and the weight of each of the passengers from the user request, e.g., stored in the user device 150 or provided by user input. In such a case, the server 130 may use the number of passengers received in the user request as the predicted number of passengers, and the server 130 may use the weight of each of the passengers received in the user request as the predicted weights of each of the passengers and/or to determine a total predicted passenger weight.

The server 130 may predict a number of items, weight, and/or dimensions of cargo based on data in the user history, as explained further below. The user history may further include data from the user's past trips such as a number of items, a weight, and dimensions of cargo associated with each passenger, past routes and a number of items of cargo, a weight, and dimensions of cargo associated with each route. The server 130 may predict the number of items, the weight, and the dimensions of cargo according to a variety of techniques, such as using an average or a mode of the number of items of cargo on past trips (i.e., the number of items of cargo with the highest occurrence in past trips) to predict the number of items of cargo; using an average or a mode of the weight of cargo on past trips (i.e., the weight of cargo with the highest occurrence in past trips) to predict the weight of cargo; and using an average or a mode of the dimensions of cargo on past trips (i.e., the dimensions of cargo with the highest occurrence in past trips) to predict the dimensions of cargo.

Additionally and/or alternatively, the server 130 may predict the number of items, the weight, and the dimensions of cargo by identifying a passenger and a type or types of cargo associated with the passenger in the user history. A type of cargo is a category that describes a kind of object included in the cargo. The server 130 can store data indicating, for respective types of cargo, an expected load capacity and/or other load requirement for the cargo type. As an example, the server 130 may determine that a passenger whose user history shows the passenger frequently travels with a bicycle, likely requires a vehicle 101 with a bicycle rack. The server 130 may predict the number of items, the weight, and the dimensions of cargo based on a past route in the user history and the types of cargo transported along the past route. As an example, the server 130 may determine a passenger boarding at a transportation hub, whose user history shows the passenger frequently travels with a single carry-on luggage, requires a vehicle 101 with cargo capacity to accommodate a single carry-on luggage.

Additionally and/or alternatively, the server 130 may receive the number of items, the weight, and the dimensions of cargo from the user request. In such a case, the server 130 may use the number of items, the weight and the dimensions of the cargo in the user request as the predicted number of items, weight and dimensions of the cargo.

Yet further, the server 130 may predict the number of items, the weight, and the dimensions of the cargo using user location data. User location data may refer to the origin, the destination and/or the distance of the route (i.e., the distance to be traveled along the route from the origin to the destination). As an example, the server 130 may store data specifying types or classes of locations associated with cargo, along with a range of likely dimensions and/or weights of such cargo. For example, the server 130 could determine that a specified trip origin or destination, e.g., a transportation hub such as an airport, train station, etc., a home improvement store, a grocery store, etc., requires a specified cargo capacity.

As another example, in addition to receiving the route origin, the server 130 may receive identification for a cargo source, e.g., a retail establishment, warehouse, etc., at the route origin, where the user is purchasing items, and a user account number or other identifier at the cargo source. The server 130 may communicate with the store, via the network 125, and the server 130 may request the number of items, weight, and dimensions of the items expected to be loaded onto the vehicle 101 at the cargo source. The server 130 may use the number of items, the weight and the dimensions of the items received from the cargo source as a predicted number of items, weight and dimensions of cargo.

Next, in a decision block 215, the server 130 determines whether the server 130 has sufficient data to predict the vehicle capacity. As an example, where the weight of a passenger is not in the user history and is not in the user request, the server 130 may conclude that the server 130 does not have sufficient data to predict the vehicle capacity. If the server 130 has sufficient data, the process 200 goes to a block 230; otherwise, the process 200 goes to a block 220.

In the block 220, through the user device 150, the server 130 may request and receive additional data from the user to predict the vehicle capacity. As an example, if the server 130 is missing the weight of a passenger, the server 130 may request the weight of a passenger from the user. As another example, the server 130 may predict the number of items of cargo using the user location data and may request the user verify whether the predicted number of items of cargo is accurate within a predetermined range. The server 130 may use the additional data to update the data the server 130 is currently using to predict the vehicle capacity.

Next, in a block 225, the server 130 may re-determine the predicted vehicle capacity using the updated data. As an example, a number of passengers in the updated data may differ from the number of passengers previously predicted by the server 130, and the server 130 may replace the predicted number of passengers with the number of passengers received in the updated data. Alternatively and as another example, the updated data may not differ from the data the server 130 used to predict the vehicle capacity, and in such a case, the server 130 may not change the predicted vehicle capacity.

In the block 230, the server 130 identifies an available vehicle 101, having the predicted vehicle load capacity and fuel/charge to provide transportation. The server 130 may search the second data store 135 for available vehicles 101 having at least a number of passenger seats to accommodate the number of expected passengers, a weight limit not exceeded by the predicted total weight of passengers and/or cargo and an adequate cargo space to accommodate the predicted dimensions of the cargo. Further, as noted above, the server 130 can determine an estimate fuel and/or energy consumption for a vehicle 101 for a requested route, including taking into account an expected load. The server 130 can further use this determination to select a vehicle 101 having a sufficient amount of vehicle and/or electrical charge for a requested route.

Next, in a block 235, the server 130 dispatches the identified vehicle 101 to the route origin. The server 130 may communicate with the vehicle computer 105 of the identified vehicle 101 through the network 125, instructing the vehicle computer 105 to actuate the vehicle 101 and drive to the route origin. The process 200 ends.

Figure 3:
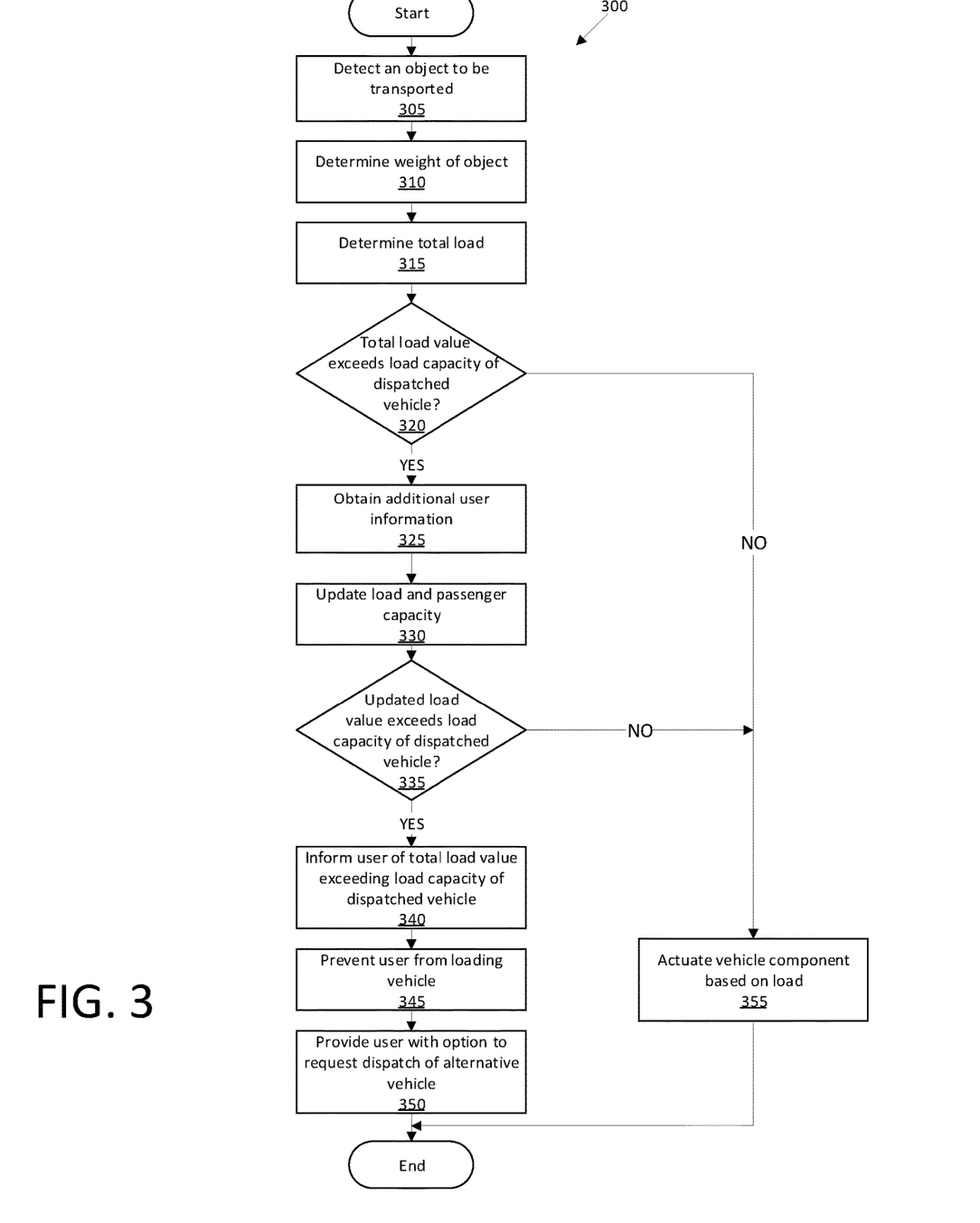
FIG. 3 is an example process for estimating the weight of passengers and/or cargo outside the vehicle and actuating the vehicle in response to the predicted weight.

FIG. 3 illustrates an exemplary process 300 for estimating the weight of passengers and/or cargo outside the vehicle 101 and actuating the vehicle 101 in response to the predicted weight. The process 300 may begin in a block 305, in which the vehicle computer 105 detects the passengers and/or the cargo outside the vehicle 101. The identity of a passenger may be confirmed based on biometric identification such as facial identification from camera sensors 110 and previously stored data such as the passenger's image. The vehicle sensors 110 detect the passengers based on the proximity of pedestrians to the vehicle 101 and the proximity between the pedestrians to each other. For example, the distance of pedestrians, orientations, and motion relative to the identified user who made the request for service may be used to identify fellow passengers. Furthermore, a user may tend to travel with other passengers, e.g. a family. In such cases, the vehicle 101 may have biometric information on those individuals to correctly associate the individual requesting service and his or her fellow passengers based on sensor 110 data confirming their identity.

The vehicle sensors 110 may detect the number of passengers using images from cameras and data 115 from LIDAR. The vehicle sensors 110 may detect the cargo based on the proximity of the cargo to the passengers or based on conventional techniques for 3D pose estimation. For example, the passenger may be carrying, pushing, or holding the cargo. The vehicle computer 105 may determine the number of items of cargo, cargo volume, and the type of cargo using images from cameras, 3-D scans from LIDAR, and machine learning algorithms such as deep learning object detection algorithms. Furthermore, if the passenger is carrying the cargo (e.g., a backpack), then 3D pose estimation and gait analysis may be used to estimate the object weight from camera and 3D sensor 110 measurements (e.g., LIDAR). In some cases the passenger may be localized but the area around the customer is blocked from view due to fixed or moving objects. In such as case, the determination of passenger cargo count, volume, and estimated weight may be inconclusive or unknown. In such an example, based on historical customer or location data, the computer 105 may predict the presence of cargo even though it is not detected by sensor 110 data. Alternatively or additionally, the computer 105 may update the vehicle 101 path plan to travel to a position where one or more sensors 110 has a view to a previously occluded space.

In a block 310, the vehicle computer 105 could, for example, predict the weight of each passenger and each item of cargo using images from the camera and/or data 115 from the LIDAR sensors, e.g., using techniques to estimate a size of a person or item of cargo from such data 115; for example, techniques are known for estimating a weight or mass of an object based on analysis of a two-dimensional image. The vehicle computer 105 may apply gait analysis on each item of cargo to determine the weight of the item, i.e., the vehicle computer 105 may determine the weight of an item of cargo by analyzing the gait of a person carrying and/or loading the item into the vehicle 101. Further, the vehicle computer 105 may determine the dimensions of each item of cargo using images from the camera and/or data 115 from the LIDAR sensors. Yet further alternatively or additionally, the computer 105 could receive data from a cargo source as described above with respect to the server 130, and use such data to predict a size, e.g., dimensions and/or weight, of cargo and/or passengers to be carried by the vehicle 101.

In or additionally, a block 315, the vehicle computer 105 determines a total weight of passengers and/or cargo, as explained below. The vehicle computer 105 typically sums the weights of the passengers and/or the cargo to determine the total weight. The vehicle computer 105 sums the dimensions of the cargo to determine the total dimensions of the cargo. As an example, the vehicle computer 105 may sum the dimensions of the cargo such that a resulting total height, weight, and depth of the cargo does not exceed the height, weight, and depth of the cargo space.

In a decision block 320, the vehicle computer 105 determines if the total weight does not exceed the load capacity of the vehicle 101. The vehicle computer 105 determines if the following conditions have been met: the number of passenger seats in the vehicle 101 will accommodate the number of passengers detected by the vehicle sensors 110, the sum of the estimated weight of the passengers and/or cargo, predicted by the vehicle sensors 110, does not exceed the load capacity of the vehicle 101, and the cargo space of the vehicle 101 can accommodate the cargo detected by the vehicle sensors 110. If the conditions are met, the process 300 proceeds to a block 355. If the conditions are not met, the process 300 proceeds to a block 325.

In the block 325, the vehicle computer 105 may interact with the user, requesting input and receiving additional data from the user, e.g., via a user device 150 and/or vehicle 101 human machine interface (HMI). The data may include a number of passengers, a weight for each passenger, a number of items of cargo, a weight for each item of cargo etc. Alternatively, the computer 105 may request images or 3D measurement such as stereo images or the use of an RGB-D image acquired by a user device 150. The vehicle computer 105 may request each passenger and each item of cargo be placed at a predetermined location outside the vehicle 101, e.g., within a field of view of one or more vehicle 101 sensors 110, e.g., to be imaged by the camera and/or scanned by a LIDAR sensor 110 of the vehicle 101. The vehicle computer 105 may update the data 115 in the vehicle computer 105 with the additional data 115. The updated data 115 in the vehicle computer 105 may include an updated number of passengers, an updated weight for each passenger and/or cargo, and updated dimensions for the cargo.

A passenger's physical location could be determined from camera sensor 110 image data. For example, image analysis can determine whether a vehicle is empty or whether one or more passengers are present. If passengers are present, then an area of the vehicle 101 at which a passenger is determined to be located, according to image data, can be identified, whereupon facial recognition along with movement identification could be used to determine if an object in the vehicle 101 is a person or some other object.

In a block 330, the vehicle computer 105 sums the updated weights of the passengers and/or the cargo to board the vehicle 101 to determine an updated total weight. The vehicle computer 105 determines the total dimensions of the cargo based on the updated dimensions for the cargo. A safety factor or the like, or a model used to estimate weight or a weight estimate may be configured to over predict weight rather than under predicting the weight, i.e., to conservatively assume that an object weighs more than it actually likely does. For example, a neural network model used for weight estimation may implement a bilinear loss function used during training of the network to over-penalize error in under prediction of weight compared to over prediction.

In a decision block 335, the vehicle computer 105 determines if the total weight does not exceed the load capacity of the vehicle and the vehicle has sufficient fuel and/or electrical energy to travel to the destination given the cargo impact on vehicle performance 101. The vehicle computer 105 determines if the following conditions have been met: the number of passenger seats in the vehicle 101 will accommodate the number of passengers detected, the sum of the estimated weight of the passengers and/or cargo does not exceed the load capacity of the vehicle 101, sufficient fuel and/or electrical energy to travel to the destination, and the cargo space of the vehicle 101 can accommodate the cargo to be loaded. If the conditions are met, the process 300 proceeds to the block 355. If the conditions are not met, the process 300 proceeds to a block 340.

In the block 340, the vehicle computer 105 may inform the user that at least one of the conditions has not been met. The vehicle computer 105 may inform the user through the user device 150, e.g., through an application on the user device 150, or through audio messages from vehicle 101 speakers or externally facing displays on the vehicle 101.

In a block 345, the vehicle computer 105 may prevent the user from boarding the vehicle 101 by actuating the vehicle 101, e.g., the vehicle computer 105 may actuate the vehicle door locks. As an example, the vehicle computer 105 may instruct the vehicle door locks to lock the vehicle 101. As another example, alternatively or additionally, the computer 105 could actuate the vehicle 101 to drive from its present location, e.g., the vehicle 101 could return to a dispatch center or, according to an instruction from the server 130, could proceed to a new route origin, i.e., a different pickup location for a different passenger and/or cargo.

In a block 350, the vehicle computer 105 may output a message to the user device, recommending the user request another vehicle 101 with sufficient vehicle capacity. The vehicle computer 105 may upload the predicted data to the server 130 and the server 130 may identify a second available vehicle 101, having sufficient vehicle capacity. The server 130 may notify the user of the second available vehicle 101. The process 300 ends.

In the block 355, the vehicle computer 105 may allow the passengers and/or the cargo to board the vehicle 101 by actuating the vehicle 101, e.g., the vehicle computer 105 may actuate the vehicle door locks to unlock the vehicle 101, and open the vehicle doors. The process 300 ends.

Figure 4:
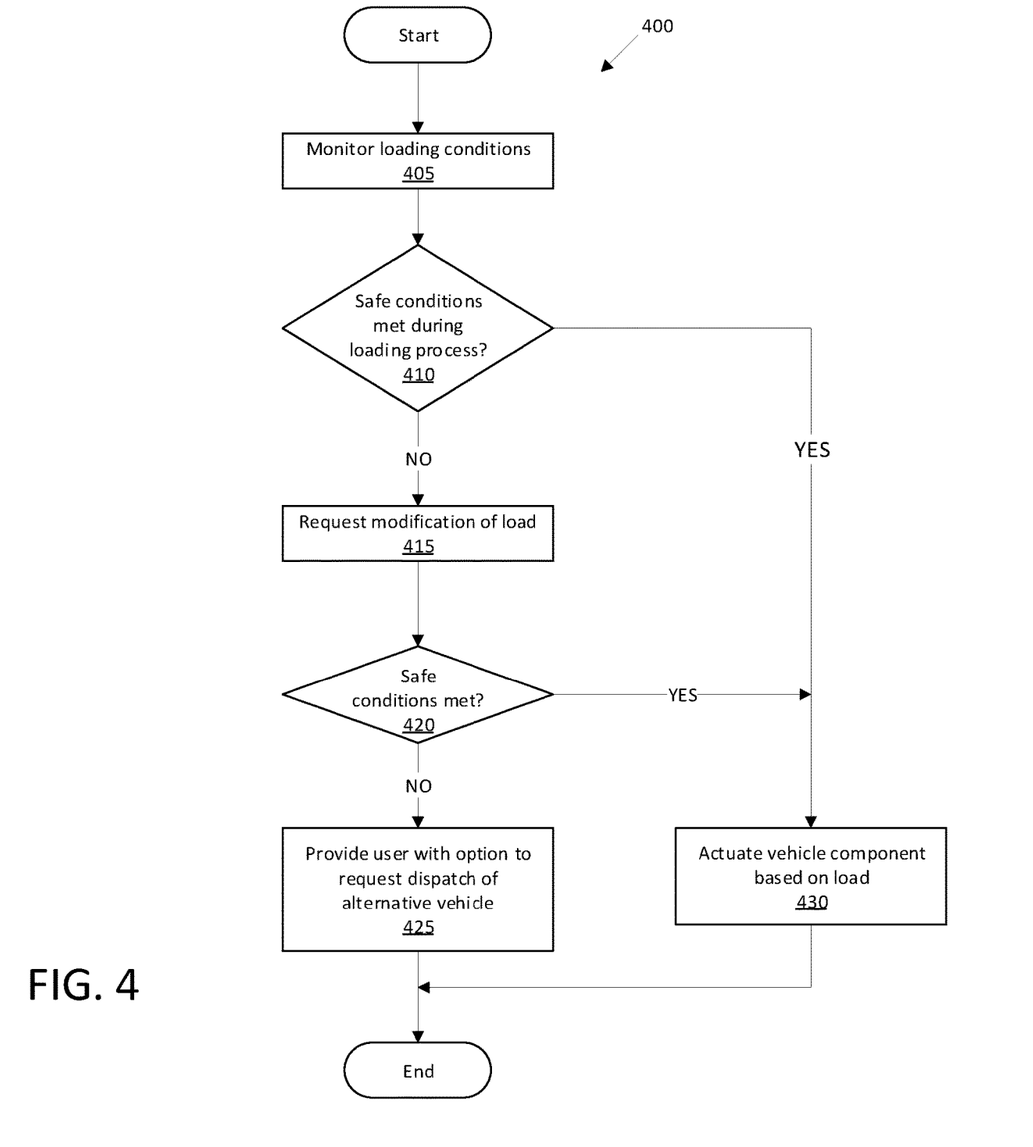
FIG. 4 is an exemplary process for monitoring the loading of cargo into the vehicle.

FIG. 4 illustrates an exemplary process 400 for monitoring the loading of cargo. The process 400 may begin when the vehicle computer 105 allows passengers and/or cargo to board the vehicle 101 by actuating the vehicle 101, e.g., the vehicle computer 105 may actuate the vehicle door locks to unlock the vehicle 101, and open the vehicle doors. The process 400 executes until the vehicle computer 105 actuates the vehicle 101, e.g., the vehicle computer 105 may actuate the vehicle 101 to drive to the route destination, or the vehicle computer 105 may output a message to the user device 150, recommending the user request another vehicle 101.

In a block 405, as cargo is being loaded into the vehicle 101, the vehicle computer 105 may monitor the change in the weight of the vehicle 101, the weight distribution of the total weight, i.e., the sum of the weights of the passengers and/or the cargo loaded within the vehicle 101, the center of gravity of the vehicle 101, and the risk of cargo shifting in the cargo space when the vehicle 101 is driving. The vehicle computer 105 monitors the change in the weight of the vehicle 101, as the passengers board the vehicle 101 and/or the cargo is being loaded into the vehicle 101, by receiving data 115 from vehicle sensors 110 such as LIDAR, stereo cameras, and hall effect sensors, as explained below.

LIDAR sensors may detect a drop in the height of the vehicle 101 as the vehicle 101 is being loaded. LIDAR sensors may output three-dimensional scans of an area surrounding the vehicle 101, before the vehicle 101 is loaded and as the vehicle 101 is being loaded, to the vehicle computer 105. A change in the three-dimensional scans before and while the vehicle 101 is being loaded may indicate a change in perspective of the LIDAR sensors and a drop in height of the vehicle or inclination 101. The LIDAR sensors may output data 115 to the vehicle computer 105, indicating the height of the drop. Stereo cameras may output three-dimensional images of the area surrounding the vehicle 101 before the vehicle 101 is loaded and as the vehicle 101 is being loaded, to the vehicle computer 105. A change in the three-dimensional images before and while the vehicle 101 is loaded, such as can be obtained via conventional image analysis techniques, may indicate a drop in height of the vehicle 101. For example, the computer 105 can be programmed to measure "disparity" in matching pixel positions to obtain an image of the disparity. Distances from a camera sensor 110 can be determined based on a calibration of the camera sensor 110 according to conventional techniques.

Vehicle sensors 110, e.g., hall effect sensors, may monitor the height of a vehicle suspension system, i.e. the clearance of the vehicle suspension system from one or more points of the ground, i.e., a surface on the earth on which the wheels of the vehicle 101 are being supported. The vehicle computer 105 may receive data 115 from which changes in vehicle 101 height and inclination can be determined from various vehicle sensors 110, and may calculate a vehicle drop measurement, e.g., based on data 115 from one of the sensors 110 or fusing, e.g., averaging, data 115 from multiple vehicle sensors 110. The vehicle computer 105 may include a look-up table or the like associating a respective vehicle drop measurements (or ranges thereof) with a respective weight loads (or ranges thereof) in a vehicle 101, and the vehicle computer 105 may calculate the total weight in the vehicle 101 by accessing the vehicle drop measurements in the look-up table.

The vehicle computer 105 may monitor the weight distribution of the total weight and the center of gravity by receiving data 115 from vehicle sensors 110 such as seat sensors, seat belt sensors, in-cabin cameras, LIDAR sensors and suspension ride height sensors.

A seat belt sensor may output data 115 to the vehicle computer 105, indicating a seat is in occupied when a seat belt is buckled, and a seat sensor may output data 115 to the vehicle computer 105, indicating the weight of a passenger in the related seat. The vehicle computer 105 may compare the output data 115 from the seat belt sensors and the seat sensors, and the location of the related seats in the vehicle to determine the weight distribution and the center of gravity.

The vehicle computer 105 may classify each passenger and/or each item of cargo based on the weight of the respective passenger and the respective item of cargo, and the vehicle computer 105 may track the location of each passenger and each item of cargo within the vehicle 101 by receiving images from the in-cabin cameras, external object tracking, and monitoring of vehicle 101 height drop and inclination. The vehicle computer 105 may determine the weight distribution and center of gravity based on the weight of each passenger and/or each item of cargo and the location of each passenger and/or each item of cargo within the vehicle 101.

LIDAR sensors may detect a drop in the height and/or a change in angle of the vehicle 101, relative to a horizontal plane, e.g., defined by points where three or more vehicle 101 wheels touch the ground, or the horizon, as the vehicle 101 is being loaded and output data 115 to the vehicle computer 105, indicating the height of the drop and the change in the angle, as discussed below. As previously explained, LIDAR sensors may output three-dimensional scans of an area surrounding the vehicle 101, before the vehicle 101 is loaded and as the vehicle 101 is being loaded, to the vehicle computer 105. A change in the three-dimensional scans before and while the vehicle 101 is being loaded may indicate a change in perspective of the LIDAR sensors and a drop in height of the vehicle 101.

LIDAR sensors positioned at different locations on the vehicle 101 may output differing measurements for the drop in height of the vehicle 101. The vehicle computer 105 may receive the differing measurements for the drop in height of the vehicle 101 and may determine the angle of the vehicle 101, relative to the horizon or a horizontal plane, e.g., a plane defined by points where three or more vehicle 101 wheel touch the ground, according to the difference in the drops in height of the LIDAR sensors and the distance between the LIDAR sensors.

Suspension ride height sensors measure the distance between various points of the suspension system and ground, and may output data 115 to the vehicle 101, indicating the distance between the suspension system and the ground at various points on the suspension system. The vehicle computer 105 may combine the output data 115 from various vehicle sensors 110 to determine the weight distribution and the center of gravity of the vehicle 101, with the passengers and/or the cargo loaded. For example, the vehicle 101 may have a magnetic/adaptive suspension, and suspension stroke sensors 110 could be used at various vehicle 101 locations, e.g., front and rear corners, to determine a vehicle 101 load and/or how the load (e.g., weight) is distributed. In other example, it is possible to use camera sensor 110 images from vehicles other than the vehicle 101 and then perform "before and after" image processing to compare a "stock unloaded vehicle" to the current vehicle 101 loading position. The distance between the vehicle's rocker panels and/or bumpers compared to the ground surface could be estimated via image processing to determine vehicle loading 101 and weight distribution estimation, e.g., a table or the like in a computer 105 memory could store load and/or distribution values for respective distances of vehicle 101 bumpers, rocker panels, etc., from the ground.

The vehicle computer 105 may determine that the cargo may shift within the vehicle 101 when the vehicle 101 is driving, causing a change in the center of gravity of the vehicle 101, by receiving data 115 from internal sensors 110, such as internal cameras. The internal cameras may send images to the vehicle computer 105, showing how the cargo is arranged. As an example, the vehicle computer 105 may receive images showing cargo in the cargo space of the vehicle 101, and the vehicle computer 105 may compute the risk of the cargo shifting as a function of the number of items of the cargo, the weight of the cargo, a coefficient of friction between the cargo and a surface of the cargo space supporting the cargo, the friction between the cargo when the items of cargo are loaded on top of each other, the dimensions and center of gravity of the cargo, the rigidity of the cargo, and a specified acceleration range of vehicle 101 when the vehicle 101 is in motion based on a planned route and historical data on an acceleration range and corresponding direction for the route. In some examples, the computer 105 may monitor the use of restraints to hold objects which may be at risk for falling or shifting due to the above calculation and recommend to the user to use such restraints. In other cases, a user may be prompted to place a loose object (e.g., a suitcase) into a storage container to mitigate a risk of injury in the event of high de-acceleration event (e.g., emergency braking). This may be accomplished via internal camera sensors 110 and object tracking based on image data. The computer 105 many monitor items placed into the vehicle 101 and confirm through image analysis that a restraint is used to secure the item if the item or object is within a camera sensor 110 field of view. Furthermore, the computer 101 may request, e.g., via the user device 150 and/or a vehicle 101 HMI, that the user or, via vehicle-to-vehicle communications, another vehicle, provide images of restraints to confirm that an object or item in the vehicle 101 is properly restrained. The vehicle 101 may additionally or alternatively be equipped with smart attachment points to monitor the working load on the restraint, e.g., attachment points having sensors 110 to detect whether a restraint is connected and/or a tension on the restraint, while vehicle 101 is being loaded as well as in motion to detect improper restraining of objects that are shifting or overload of the restraint or attachment point working load limit. Further alternatively or additionally, the vehicle 101 may monitor a load on the hitch of the vehicle 101, trailer sensors, or through vehicle 101 sensors, e.g., cameras, to detect trailer drop height and inclination.

In a decision block 410, the vehicle computer 105 determines if the following conditions have been met: the total weight of the passengers and/or cargo does not exceed the load capacity of the vehicle 101, the weight distribution of the vehicle 101 is acceptable between the wheels of the vehicle 101, the center of gravity of the vehicle 101 is within a predetermined range, and the risk of cargo shifting when the vehicle 101 is moving is within a predetermined range. If the conditions are met, the process 400 proceeds to a block 430. If the conditions are not met, the process 400 proceeds to a block 415. Furthermore, the computer 105 may detect an acceptable total weight below the maximum load capacity for the vehicle 101, and appropriate weight distributions for the detected load, and take action based on the detected load and/or weight distributions. For example, the vehicle 101 may be loaded such that it may not travel along certain low weight load limit bridges or it may avoid roads with certain grades such that the computer 105 may modify path and motion planning. For example, the vehicle 101 may modify spacing between itself and a preceding vehicle to account for the effect of the cargo load on a stopping distance of the vehicle 101.

In the block 415, the vehicle computer 105 may request user input, e.g., via the user device 150, that each passenger move from the passenger's present seat to another seat within the vehicle 101 and/or the cargo be rearranged in the cargo space of the vehicle 101.

In a decision block 420, the vehicle computer 105 determines if the following conditions have been met: the total weight of the passengers and/or cargo does not exceed the load capacity of the vehicle 101, the weight distribution of the vehicle 101 is even between the wheels of the vehicle 101, the center of gravity of the vehicle 101 is within a predetermined range, and the risk of cargo shifting when the vehicle 101 is moving is within a predetermined range. If the conditions are met, the process 400 proceeds to a block 430. If the conditions are not met, the process 400 proceeds to a block 425.

In the block 425, the vehicle computer 105 may inform the user that at least one of the conditions has not been met. The vehicle computer 105 may inform the user through the user device 150, e.g., through an application on the user device 150. The vehicle computer 105 may prevent the vehicle 101 from driving by not actuating the vehicle 101. The vehicle computer 105 may output a message to the user device 150, recommending the user request another vehicle 101 with sufficient vehicle capacity. The vehicle computer 105 may upload the measured data 115 to the server 130 and the server 130 may identify a second available vehicle 101, having sufficient vehicle capacity. The server 130 may notify the user of the second available vehicle 101. The process 400 ends.

In the block 430, the vehicle computer 105 may actuate the vehicle 101 and drive to the route destination. The process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Python, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A method, executed in a computer comprising a processor and a memory such that the method comprises:
receiving data from one or more sensors in a vehicle;
detecting an object outside of a vehicle with the data received from the one or more sensors;
predicting a load for the vehicle at least in part based on classifying the object; and
actuating a vehicle component to at least one of control a vehicle opening, control vehicle motion, or restrict vehicle motion, based on whether the predicted load exceeds a capacity of the vehicle to accept the object according to the load predicted at least in part based on classifying the object detected outside of the vehicle.

2. The method of claim 1, further comprising, based on classifying the object, determining whether the vehicle can accept the predicted load.

3. The method of claim 1, further comprising specifying a location within a vehicle sensor field of view at which the object is to be detected.

4. The method of claim 1, further comprising, upon determining that the vehicle cannot accept the predicted load, transmitting a message to a user.

5. The method of claim 1, further comprising predicting the load according to at least one of a weight and a volume of the object.

6. The method of claim 1, further comprising predicting the load based on user data in addition to classifying the object.

7. The method of claim 6, wherein the user data includes one or more of a location, a destination, a load history, and a number of user-specified cargo objects.

8. The method of claim 1, further comprising predicting the load in part based on an estimated size of the object.

9. The method of claim 1, further comprising predicting the load in part based on data from a cargo source.

10. The method of claim 1, wherein the data received from the one or more sensors includes at least one of an image, LIDAR data, weight sensor data, and vehicle suspension data.

11. A computer comprising a processor and a memory, the memory storing instructions executable by the processor to:
receive data from one or more sensors in a vehicle;
detect an object outside of a vehicle with the data received from the one or more sensors;
predict a load for the vehicle at least in part based on classifying the object; and
actuate a vehicle component to at least one of control a vehicle opening, control vehicle motion, or restrict vehicle motion, based on whether the predicted load exceeds a capacity of the vehicle to accept the object according to the load predicted at least in part based on classifying the object detected outside of the vehicle.

12. The computer of claim 11, the memory further storing instructions to, based on classifying the object, determine whether the vehicle can accept the predicted load.

13. The computer of claim 11, the memory further storing instructions to specify a location within a vehicle sensor field of view at which the object is to be detected.

14. The computer of claim 11, the memory further storing instructions to, upon determining that the vehicle cannot accept the predicted load, transmit a message to a user.

15. The computer of claim 11, the memory further storing instructions to predict the load according to at least one of a weight and a volume of the object.

16. The computer of claim 11, the memory further storing instructions to predict the load based on user data in addition to classifying the object.

17. The computer of claim 16, wherein the user data includes one or more of a location, a destination, a load history, and a number of user-specified cargo objects.

18. The computer of claim 11, the memory further storing instructions to predict the load in part based on an estimated size of the object.

19. The computer of claim 11, the memory further storing instructions to predict the load in part based on data from a cargo source.

20. The computer of claim 11, wherein the data received from the one or more sensors includes at least one of an image, LIDAR data, weight sensor data, and vehicle suspension data.

* * * * *